(12) United States Patent
Benecke

(10) Patent No.: US 6,679,648 B2
(45) Date of Patent: Jan. 20, 2004

(54) CHAIN JOINT AND CENTER PIECE FOR SUCH CHAIN JOINT

(75) Inventor: Rainer Benecke, Herdecke (DE)

(73) Assignee: J. D. Theile GmbH & Co. KG, Schwerte (DE)

( * ) Notice: Subject to any disclaimer, the term of this patent is extended or adjusted under 35 U.S.C. 154(b) by 87 days.

(21) Appl. No.: 10/024,411

(22) Filed: Dec. 17, 2001

(65) Prior Publication Data

US 2002/0130310 A1 Sep. 19, 2002

(30) Foreign Application Priority Data

Dec. 16, 2000 (DE) .......................................... 100 62 973

(51) Int. Cl.⁷ .............................................. F16G 13/06
(52) U.S. Cl. .................... 403/408.1; 403/315; 403/282; 59/85
(58) Field of Search ........................... 59/85; 403/408.1, 403/315, 316, 317, 282, 318, 319, 320, 294, 287, 286, 289, 339, 340

(56) References Cited

U.S. PATENT DOCUMENTS 3,314,700 A * 4/1967 Burrell ....................... 403/385
4,505,103 A * 3/1985 Dalferth et al. ................. 59/85
6,216,434 B1 * 4/2001 Dalferth et al. ................. 59/85
6,216,435 B1 * 4/2001 Bogdan et al. ................. 59/85

FOREIGN PATENT DOCUMENTS

| DE | 298 11 332 U 1 | 11/1998 |
| DE | 199 14 014 A1 | 10/2000 |

* cited by examiner

Primary Examiner—John R. Cottingham
(74) Attorney, Agent, or Firm—Rick Martin; Patent Law Offices of Rick Martin, P.C.

(57) ABSTRACT

A chain joint for a high-strength link chain is disclosed. The chain joint is formed from two joint parts form-fittingly connected with one another and a center piece braced on the two opposing longitudinal side bars of joint parts. The center piece is detachably disposed with respect to the joint parts. The center piece is formed from a fitting plug and at least one fitting element indicating the specified set-in position of the fitting plug based on resilient material properties. The fitting element serves a fitting sleeve, into which the fitting plug can be set and in which the fitting plug is at least predominantly enclosed.

16 Claims, 3 Drawing Sheets

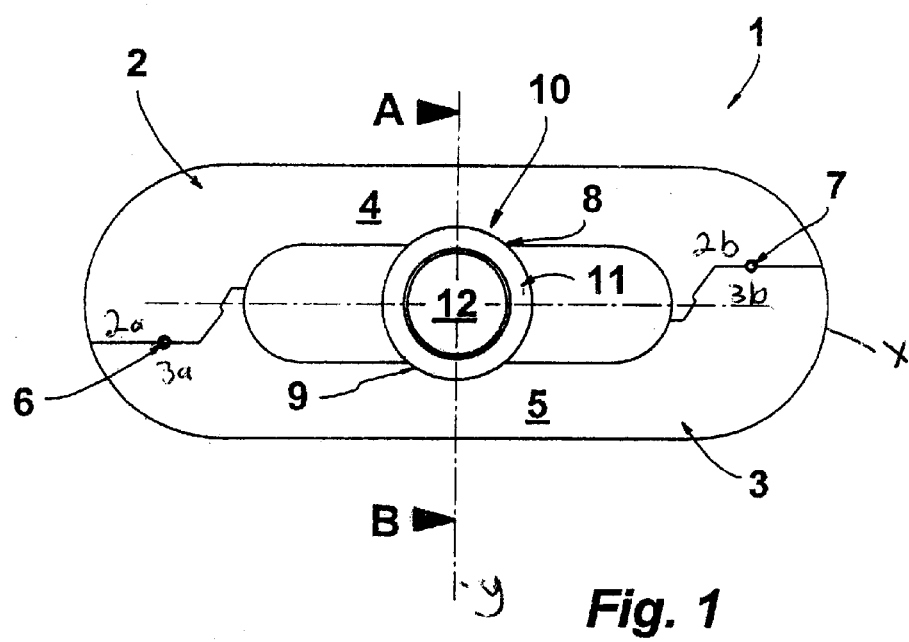
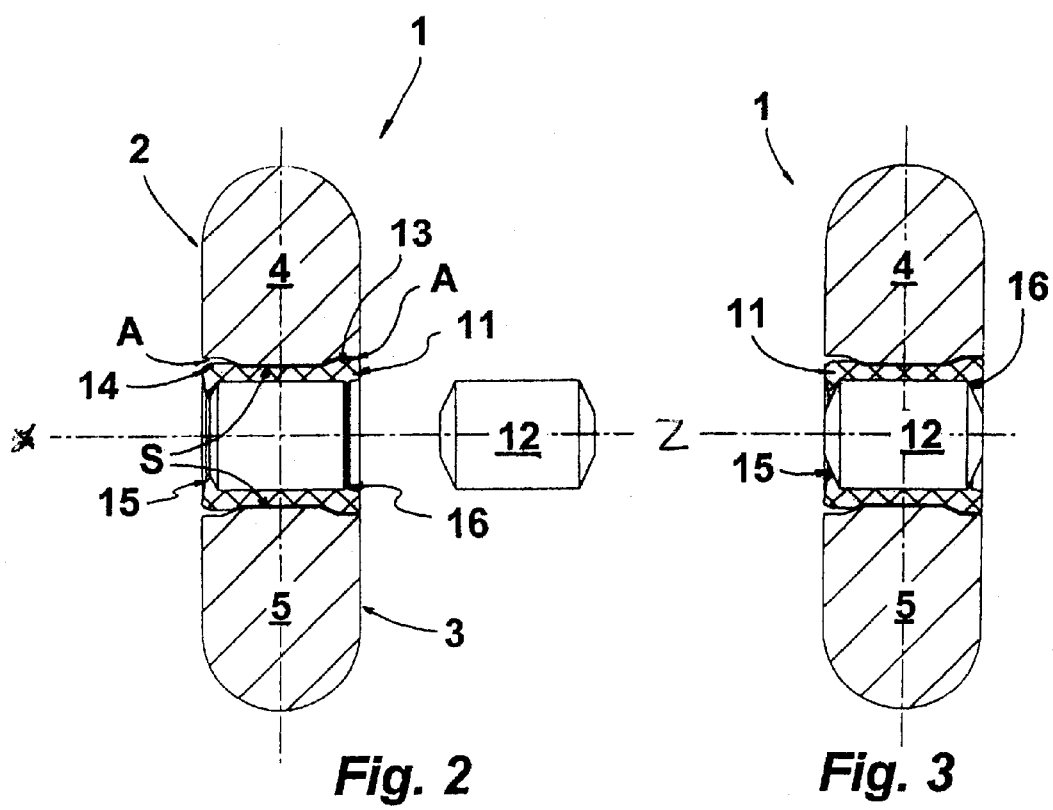

CHAIN JOINT AND CENTER PIECE FOR SUCH CHAIN JOINT

CROSS REFERENCE APPLICATIONS

This application claims priority from application serial number 100 62 973.3 which was filed in Germany on Dec. 16, 2000.

FIELD OF INVENTION

The present invention relates to chain joints for high strength linked chains.

BACKGROUND OF THE INVENTION

DE 199 14 014 A1 discloses a chain joint in which the two joint parts can be brought into engagement with one another under displacement in the longitudinal direction. For this purpose, the one joint part comprises a peg and the other joint part a receiver. This chain joint is locked by a center piece employed as a joining element which is in contact on a support face of a projection associated with each longitudinal side bar and projecting into the opening encompassed by the joint parts. This joining element developed as a center piece comprises a fitting plug which carries three retaining rings disposed in grooves. The fitting plug comprises a cylindrical shell such that the support faces, associated with the two longitudinal side bars, are correspondingly developed complementarily in the form of a trench. After the two joint parts have been brought form-fittingly into engagement, the locking of the joint parts takes place by the driving of the fitting plug into the volume encompassed by the support faces. A relative movement of the two joint parts in the longitudinal direction toward one another is prevented by the introduction of the fitting plug. Into each support face is introduced a groove which, with the specified positioning of the fitting plug, a retaining ring engages such that a user can perceive when the fitting plug is in its specified locking position between the support faces.

However, in the case of the subject matter of this chain joint through the center piece not only a locking of the chain joint is provided but the bracing of the two longitudinal side bars of the joint parts also takes place in the center region against one another such as is also known from the German Utility Model 298 11 332 U1. The center bar described in this document is formed in the case of the subject matter of DE 199 14 014 A1 by the projections carrying the support faces and the center piece. The center bar serves as a support between the two longitudinal side bars in order to counteract the constriction of the longitudinal side bars under tensile loading of the chain joint.

By providing such a center bar developed in several parts such as in the subject matter of DE 199 14 014 A1, however, operation of the center piece comprised of the fitting plug and the retaining rings employed as fitting elements is considered disadvantageous. This is because the chain links suspended in a joint part hardly have enough space for the chain links adjoining the said joint to be moved in the openings of the chain joint to open or close the chain joint by displacing the two joint parts in the longitudinal direction relative to one another. Moreover, the operation during the driving-in or driving-out of the center piece serving as locking is not always free of problems due to the fitting plug, which, in the subject matter of DE 199 14 014 A1, is intentionally kept as small as feasible.

Building on this discussed prior art, the present invention therefore addresses the problem of further developing a chain joint or a center piece described in the introduction such that the listed disadvantages entailed in prior art are avoided.

This problem is solved according to the invention, for one, with a chain joint and, for another, with a center piece, in each case thereby that as the fitting element serves a fitting sleeve into which the fitting plug can be set and in which the fitting plug is at least largely enclosed.

The chain joint of the present invention and, correspondingly also in the claimed center piece, is formed from a fitting sleeve, which functions as a fitting element with resilient material properties, and fitting plug, which can be set into the fitting sleeve. After the fitting plug has been set into the fitting sleeve it is at least predominantly enclosed in the fitting sleeve. Setting the center piece in the present invention can take place in two steps. First the fitting sleeve is disposed in its specified position between the two longitudinal side bars of the joint parts. Then the fitting plug is set into the fitting sleeve, using hammer blows or similar methods.

The fitting sleeve of the present invention compared to a retaining ring from prior art is considerably larger and therefore much simpler to handle and easier to get into place. In rough operation below ground and similar locations the ease of setting the fitting sleeve can be very advantageous. The fitting sleeve can moreover be manufactured of a synthetic material such that it can be fabricated in a cost-effective manner, for example by way of an injection molding process. The fitting plug to be set into the fitting sleeve accordingly does not have to have grooves but is appropriately only chamfered at its two ends. Thus the difficult step necessary in the prior art of introducing the grooves into the fitting plug receiving the retaining rings is thus eliminated. The fitting sleeve also permits the pre-assembling of the two joint parts with respect to one another. This allows a preliminary security function in that the center piece can be employed as a preliminary locking element. Only when the chain joint is in fact to be closed, the fitting plug is driven into the fitting sleeve in order to be subsequently held clamped between the two longitudinal side bars, separated from them by the fitting sleeve.

Therefore the center, in principle, can also be employed in such chain joints or also in individual chain links if only a mutual bracing of the longitudinal side bars is desired. For this purpose it fundamentally does not require additional complex and expensive measures. When support faces are provided on the longitudinal side bars, it is sufficient if these have each recesses of low depth in order to define the set-in position of the sleeve. It can also be provided to form projections on the two longitudinal side bars opposing one another, which form support faces on the sides facing one another, between which the fitting sleeve and the fitting plug are disposed as the center piece.

It is also possible in the present invention for the fitting plug, as well as the fitting sleeve, to have a cross sectional other than the conventional circular cross sectional area, for example an oval or rectangular form. In the case of such a form the width of the center bar also formed by this center piece is relatively narrow even at a relatively large distance of the longitudinal side bars of the joint parts with respect to one another. This means that more space is available for moving suspended chain links in order to be able to open and close such chain joints without any of the problems seen in those joint parts which must be displaced in the longitudinal direction relative to one another for opening and closing the chain joint.

In the preferred embodiment beadings indicate the set-in position of the fitting plug within the fitting sleeve. These beadings are located at each end of the fitting sleeve and project inward to enclose the fitting plug at each end. It is useful to design the fitting sleeve such that the fitting plug can only be set into the fitting sleeve from one side by having one of the beadings project in much further. This allows the larger beading to function as a stop for limiting the driving-in movement of the fitting plug.

The fitting sleeve can also be provided with outwardly projecting collars, or flanges, which fit into support shoulders on the support faces of the longitudinal side bars. These collars both hold the fitting sleeve in place between the support faces and prevent the unintentional ejection of the sleeve during the driving-in of the fitting plug.

SUMMARY OF THE INVENTION

The present invention is a chain joint for a high-strength link chain comprising two joint parts form-fittingly connected with one another and a center piece braced on the two opposing longitudinal side bars of the joint parts and detachably disposed with respect to the joint parts. The center piece comprises a fitting plug and at least one fitting element indicating, based on resilient material properties, the specified set-in position of the fitting plug. Another aspect of the present invention is a center piece for a chain joint of a high-strength steel link chain with a fitting plug and at least one fitting element indicating the set-in position of the fitting plug based on resilient material properties.

Other aspects of this invention will appear from the following description and appended claims, reference being made to the accompanying drawings forming a part of this specification wherein like reference characters designate corresponding parts in the several views.

BRIEF DESCRIPTION OF THE DRAWINGS

FIG. 1 is a side view of a chain joint with a set-in center piece.

FIG. 2 is a cross section through the chain joint of FIG. 1 along line A–B in a first assembly position.

FIG. 3 is the representation of FIG. 2 with the completely assembled center piece.

Figure 4:
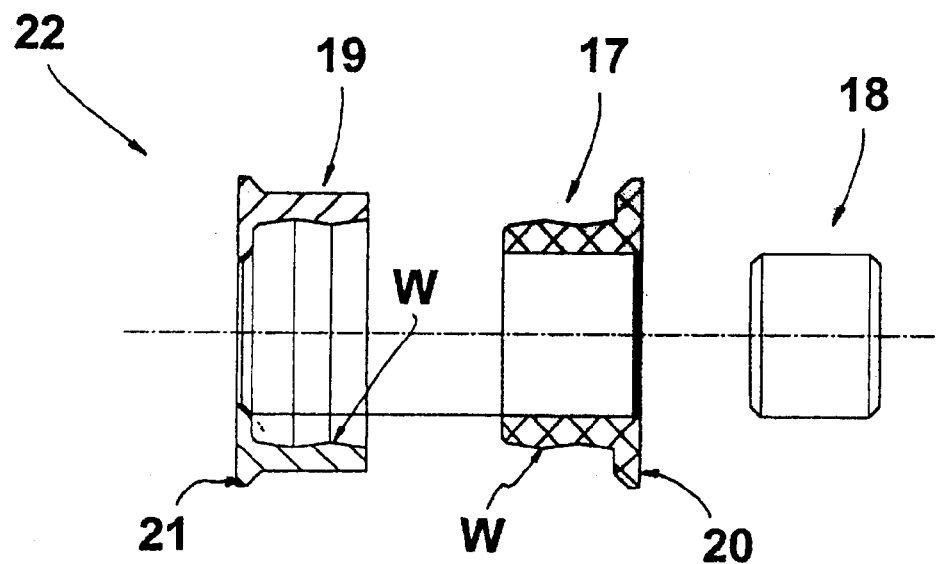
FIG. 4 is a partially sectioned representation of an alternate embodiment of the center piece.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Referring first to FIG. 1, a chain joint 1 comprises right and left joint parts 2, 3 which have an end region 2a, 2b and 3a, 3b each extending approximately about a quarter circle arc and a longitudinal side bar 4, 5 connecting the two end regions with one another. The two joint parts 2, 3 in the region of their two ends are form-fittingly placed into engagement with one another along complementary, locking surfaces. The locking surfaces act to lock the two pieces 2 and 3 together along the normal axis Y. The joint parts 2, 3 can be displaced relative to one another along the longitudinal axis X for opening or closing the chain joint.

For the additional holding of the two joined joint parts 2, 3 for forming the chain joint 1, in each end region a locking pin 6, 7 is driven in transversely to the longitudinal extent of the chain joint 1, which in each end region extends through both joint parts 2 or 3.

The center region of the longitudinal side bars 4, 5 have a trench form recess 8, 9 of low depth. The recesses 8, 9 form opposing support faces S for the setting-in of a centerpiece 10. The centerpiece 10 itself is formed of a fitting sleeve 11 and a cylindrical fitting plug 12 driven into the fitting sleeve 11.

The forming of the recesses 8, 9 of joint parts 2, 3 as well as of the centerpiece 10 is evident in FIGS. 2 and 3. The support faces S formed by the recesses 8, 9 have a shoulder A, which, via an oblique face, adjoins the support face S proper. The shoulders A serve for holding the fitting sleeve 11 in place. Fitting sleeve 11 has at one end a collar 13 developed approximately complementarily to the forming of a shoulder A. This approximately complementary development of the collar 13 to a shoulder A prevents sleeve 11 slipping out of the chain joint 1 when fitting plug 12 is driven into sleeve 11. Together with a shoulder A, the collar 13 thus serves as a stop. At the opposing end from collar 13, fitting sleeve 11 also has a further collar 14. Collar 14 is smaller than collar 13, as shown in the FIGS. 2, 3. The height of the collar 14 is sufficient for the sleeve 11, set into its position between the longitudinal side bars 4, 5 of joint parts 2, 3, not to fall out.

The fitting sleeve 11 comprises at its foot end an inward projection 15, which serves as a stop for the fitting plug 12. Near the upper end of fitting sleeve 11 a second inward projection 16 is provided, which is smaller projection 15, and extends behind the fitting plug 12 when the fitting plug is driven into the fitting sleeve 11. The fitting sleeve 11 in this embodiment example is fabricated as an injection molded part of a synthetic material. The fitting plug 12 to be set into the fitting sleeve 11 in this case is a rotationally symmetric steel plug whose two ends are chamfered in order to facilitate setting the fitting plug 12 into the fitting sleeve 11.

FIG. 3 shows the fitting plug 12 set into the fitting sleeve 11. Based on this representation, it is evident that the foot of the fitting plug 12 is in contact on the projection 15 of the fitting sleeve 11 serving as a stop and that the projection 16 extends behind the fitting plug 12. The fitting plug 12 normally is to be driven into sleeve 11 with blows of a hammer along the transverse axis Z.

In this way with simple means bracing of the two longitudinal side bars 4, 5 with one another is realizable, wherein in the depicted embodiment example the center piece represents simultaneously the center bar.

In a further development, not shown, of the fitting sleeve of FIGS. 1–3, the foot region of the fitting sleeve 11 with projection 15 is developed such that it is slit in order to be able to set and remove the fitting sleeve more readily into or from the chain joint.

FIG. 4 shows a further center piece denoted overall by 22, which, in addition to a fitting sleeve 17 and a fitting plug 18, has a further sleeve 19 of steel, wherein the fitting sleeve 17 can be set into the sleeve 19 before the fitting plug 18 is driven into the fitting sleeve 11 for securing the center piece 22. The fitting sleeve 17 and the fitting plug 18 have each a stop flange 20 or 21, with which the sleeves 17, 19 engage the corresponding shoulders A of joint parts 2, 3. The assembled centerpiece 22 is made of the fitting sleeve 17, the fitting plug 18 and the sleeve 19, is shown in FIG. 5.

Figure 5:
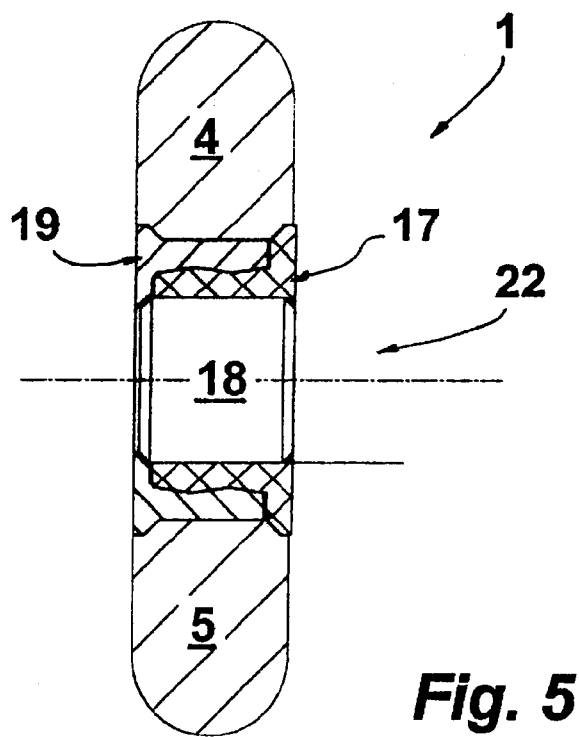
FIG. 5 is a cross sectional view of the alternate embodiment center piece of FIG. 4.

In the embodiment example shown in FIGS. 4 and 5 in each instance a sleeve 17, 19 is to be set into the receivers A of the chain joint from opposite sides before the fitting plug 18 is driven in. For securing the two sleeves 17, 19 with one another, beadings which engage corresponding complementarily developed recesses of other part are provided. The beadings are denoted by the reference symbol W; next to each beading are located the corresponding recess for receiving beading W of the other sleeve. In the centerpiece 22 the fitting sleeve 17 is also an injection molded part of a synthetic material.

Figure 6:
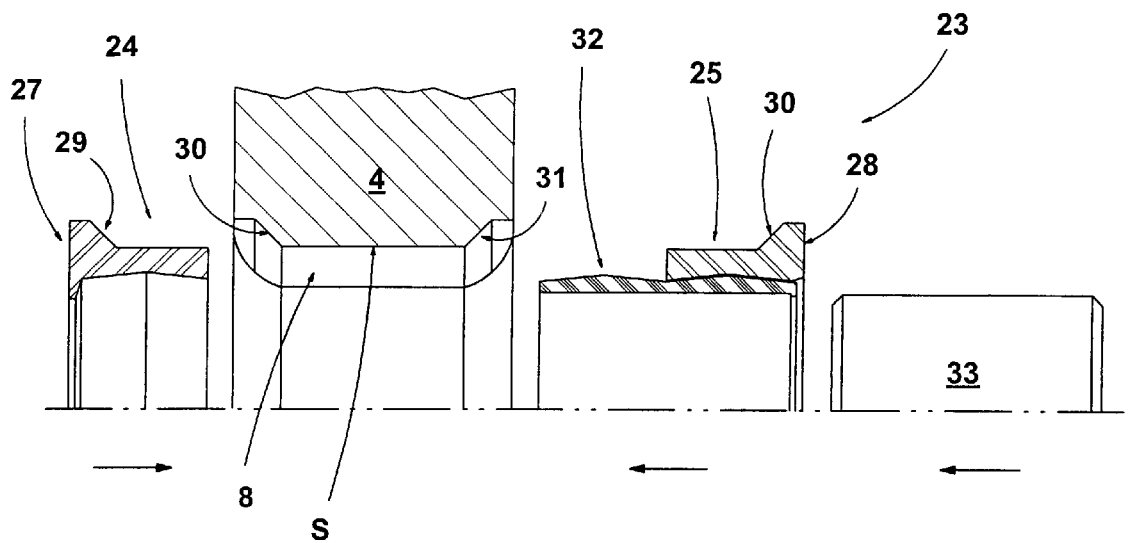
FIG. 6 is a partial cross section through the chain joint of FIG. 1 along line A–B with a second alternate embodiment of the center piece in a first assembly position.
Figure 7:
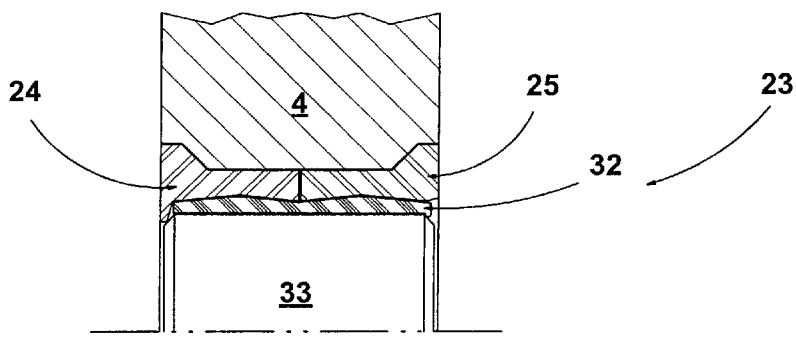
FIG. 7 the representation of FIG. 5 with the completely assembled center piece.

A further embodiment of the chain joint or the centerpiece for a chain joint according to FIGS. 4 and 5 is shown in FIGS. 6 and 7. In contrast to the embodiment depicted in FIGS. 4 and 5, the center piece 23 of this embodiment comprises two outer sleeves 24, 25. The extension of the both sleeves 24, 25 reaches approximately to the middle of the support face S of the longitudinal side bar 4. Therefore the support face S is contacted by both sleeves 24, 25. The sleeves 24, 25 have a cylindrical outer surface in the region in which they come into contact with the support face S. Their inner surface shows a thinning, in which the fitting sleeve 32 is inserted with complementary thickenings. In this manner the two sleeves 24, 25 are held together by way of the fitting sleeve 32.

The fitting sleeve 32 is made from synthetic material and the two outer fitting sleeves are made of steel or similar material. The sleeves 24, 25 can be set in from opposite sides in order to contact the support faces S of the longitudinal side bars 4, 5 of the chain joint 1. Both sleeves 24, 25 carry at their outer end a collar 27, 28. Both collars 27, 28 show inclined shoulders 29, 30, which come into contact with inclined surfaces 30, 31 the longitudinal side bar 4, 5 terminating the support face S. One of these two outer sleeve parts has an inwardly projecting flange as stop limitation for setting in the fitting sleeve 32 from the side opposite to the sleeve part. The fitting sleeve 32 can be pre-assembled with one of the two outer sleeves 24, 25 as shown in FIG. 6. To attain a form fitting in the assembling direction between the fitting sleeve and the two outer sleeves, it can be provided that the fitting sleeve has outwardly projecting beadings corresponding to the beadings shown in FIGS. 4 and 5, which engage corresponding recesses of the sleeve parts.

The fitting sleeves 11, 17 depicted in the figures are provided as synthetic material parts. However, for realizing the invention it is also possible to produce these fitting sleeves of another material with spring-resilient properties, for example also of steel but the use of plastic is preferred.

FIG. 7 shows the completely mounted center piece 23 put in its locking position into the chain lock 1 as to be seen in its contact to the longitudinal side bar 4 fixed together with the fixing plug 33.

By way of description of these embodiments using the outer sleeves it is evident, that locking the two joint parts 2, 3 of the chain lock is actually achieved by the outer sleeves, which therefore may be referred to as locking sleeves. The fitting plug is used to keep the locking arrangement in position and in particular to block movements of the longitudinal side bars in a direction directed to each other, when the chain lock is under stress.

Further it is to be seen, that with the embodiments described it is easy to remove the locking devices even after along usage of the chain lock, in particular because the sleeves do not have to be brought out of any undercut.

| List of Reference Symbols | |
|---|---|
| 1 | Chain joint |
| 2 | Joint part |
| 3 | Joint part |
| 4 | Longitudinal side bar |
| 5 | Longitudinal side bar |
| 6 | Locking pin |
| 7 | Locking pin |
| 8 | Recess |
| 9 | Recess |
| 10 | Center piece |
| 11 | Fitting sleeve |
| 12 | Fitting plug |
| 13 | Collar |
| 14 | Collar |
| 15 | Projection |
| 16 | Projection |
| 17 | Fitting sleeve |
| 18 | Fitting plug |
| 19 | Sleeve |
| 20 | Stop flange |
| 21 | Stop flange |
| 22 | Center piece |
| 23 | Center piece |
| 24 | Sleeve |
| 25 | Sleeve |
| 26 | Fitting sleeve |
| 27 | Collar |
| 28 | Collar |
| 29 | Shoulder |
| 30 | Surface |
| 31 | Surface |
| 32 | Fitting sleeve |
| 33 | Fitting plug |
| A | Shoulder |
| S | Support face |

Although the present invention has been described with reference to preferred embodiments, numerous modifications and variations can be made and still the result will come within the scope of the invention. No limitation with respect to the specific embodiments disclosed herein is intended or should be inferred.

I claim:

1. Chain joint for a high-strength link chain comprising:

a first and a second joint part form-fittingly connected with one another, each joint part having an opposing longitudinal side bar;

a center piece braced between the longitudinal side bars and detachably disposed with respect to the joint parts;

said center piece comprising a fitting plug and at least one fitting sleeve made from a resilient material;

said fitting sleeve functioning to specify a set-in position of the fitting plug whereby the fitting sleeve servers as a fitting element into which the fitting plug can be set and in which the fitting plug is at least predominantly enclosed; and, the center piece further comprising at least one further fitting sleeves concentrically disposed outside of a first fitting sleeve into which the first fitting sleeve can be set, wherein in each instance the first sleeve can be introduced from the one side of the chain joint and the other sleeve from the other side into the chain joint.

2. A center piece for a chain joint of a high-strength link chain, said center piece comprising:

a fitting plug and at least one fitting sleeve;

said fitting sleeve being comprised of resilient material and functioning to indicate a set-in position of the fitting plug in the chain joint;

whereby the fitting sleeve serves as a fitting element into which the fitting plug can be set and in which the fitting plug is at least predominantly enclosed; and the center piece further comprising at least one further fitting sleeves concentrically disposed outside of a first fitting sleeve into which the first fitting sleeve can be set, wherein in each instance the first sleeve can be introduced from the one side of the chain joint and the other sleeve from the other side into the chain joint.

3. The center piece as claimed in claim 1 or 2, wherein the fitting sleeves are a synthetic, injection molded part.

4. The center piece as claimed in claim 3, wherein a final position of the fitting plug within the fiting sleeve by a plurality of projections on the fiting sleeves projecting into the interior of the fitting sleves.

5. The center piece as claimed in claim 1 or 2 wherein two further fitting sleeves are provided, each disposed concentrically outside of the first fitting sleeve, which can each be introduced into the chain joint from opposing sides.

6. Chain joint for a link chain with two joint parts form-fittingly connected with one another, each joint part having a longitudinal side bar, and a center piece braced on the two opposing longitudinal side bars of the joint parts, and detachably disposed with respect to the joint parts, said center piece comprising:

a fitting plug and a fitting sleeve having an outer surface and an inner surface, into which is set the fitting plug when the chain joint is closed;

a locking sleeve having an outer surface and an inner surface;

the outer surface of the locking sleeve being in contact with support faces of the longitudinal side bars;

the fitting sleeve is set in the side locking sleeve with its outer surface in contact on the inner surface of the locking sleeve;

wherein the locking sleeve and the fitting sleeve are set from the opposite sides into a closure position for forming the center piece between the longitudinal side bars; and both sleeves further comprising a stop cooperating with the longitudinal side bars of the joint parts for delimiting a setting-in movement.

7. The chain joint as claimed in claim 6, wherein the fitting sleeve is a synthetic material part, in particular a synthetic injection molded part.

8. The chain joint as claimed in claim 6 or 7, wherein the fitting sleeve is held on the outside form-fittingly on the inner shell surface of the locking sleeve.

9. The chain joint as claimed in one of claims 6 to 7, wherein the locking sleeve further comprises a projection directed radially inwardly as a stop for delimiting the setting-in movement of the fitting plug.

10. The chain joint as claimed in claim 8, wherein the locking sleeve further comprises a projection directed radially inwardly as a stop for delimiting the setting-in movement of the fitting plug.

11. The chain joint as claimed in one of claims 6 to 7, wherein the fitting sleeve in the proximity of its outer end carries an encircling, outwardly projecting stop collar as a stop which engages a shoulder of the longitudinal side bars of the joint parts.

12. The chain joint as claimed in claim 8, wherein the fitting sleeve in the proximity of its outer end carries an encircling, outwardly projecting stop collar as a stop which engages a shoulder of the longitudinal side bars of the joint parts.

13. The chain joint as claimed in claim 9, wherein the fitting sleeve in the proximity of its outer end carries an encircling, outwardly projecting stop collar as a stop which engages a shoulder of the longitudinal side bars of the joint parts.

14. Chain joint as claimed in one of claims 6 to 7, wherein the center piece further comprises a second locking sleeve, into which the fitting element can be set with each locking sleeves being set into the chain joint from opposite sides.

15. The chain joint as claimed in claim 8, wherein the center piece further comprises a second locking sleeve, into which the fitting element can be set with each locking sleeves being set into the chain joint from opposite sides.

16. The chain joint as claimed in claim 9, wherein the center piece further comprises a second locking sleeve, into which the fitting element can be set with each locking sleeves being set into the chain joint from the opposite sides.

* * * * *